United States Patent [19]

Takashima et al.

[11] Patent Number: 4,939,020
[45] Date of Patent: Jul. 3, 1990

[54] CORE MEMBER FOR FABRICATION OF SHAPED PLASTIC

[75] Inventors: Katsuhiko Takashima; Katsuhiro Moriwaki, both of Sennan, Japan

[73] Assignees: Toyo Coth Co., Ltd., Sennan; Japan U-PICA Co., Ltd., Tokyo, both of Japan

[21] Appl. No.: 210,965

[22] Filed: Jun. 24, 1988

[30] Foreign Application Priority Data

Jun. 24, 1987 [JP] Japan .............................. 62-156989

[51] Int. Cl.$^5$ .............................................. B32B 5/16
[52] U.S. Cl. .................................. 428/220; 428/283; 428/288; 428/289; 428/290; 428/311.1; 428/311.5; 428/317.7
[58] Field of Search ............... 428/283, 290, 314.4, 428/288, 311.1, 220, 289, 311.5, 317.7

[56] References Cited

U.S. PATENT DOCUMENTS

| | | | |
|---|---|---|---|
| 3,070,817 | 1/1963 | Kohin et al. | 428/314.4 |
| 4,226,906 | 10/1980 | Jacob | 428/290 |
| 4,481,124 | 11/1984 | Kawashima et al. | 428/283 |
| 4,818,583 | 4/1989 | Geel | 428/290 |
| 4,820,575 | 4/1989 | Kölzer | 428/283 |

FOREIGN PATENT DOCUMENTS

| | | | |
|---|---|---|---|
| 0074346 | 5/1983 | Japan | 428/283 |
| 0115160 | 7/1983 | Japan | 428/283 |

Primary Examiner—Marion C. McCamish
Attorney, Agent, or Firm—Armstrong, Nikaido, Marmelstein, Kubovcik & Murray

[57] ABSTRACT

The invention core member is prepared by treatment of non-woven fabric with a coating composition which comprises an emulsion-form curable vinyl polymer, heat-expandable microspheres, and a thiocyanate compound, and this core member is advantageously utilized with use of liquid-form unsaturated polyester-based molding composition which contains a cobalt-containing compound as cure accelerator, wherein color development becomes available when said unsaturated polyester-based liquid composition infiltrates into voids of the core member, due to encounter of the thiocyanate compound with the cobalt-containing compound, thereby infiltration of said liquid composition is monitored by use of the color development.

8 Claims, 1 Drawing Sheet

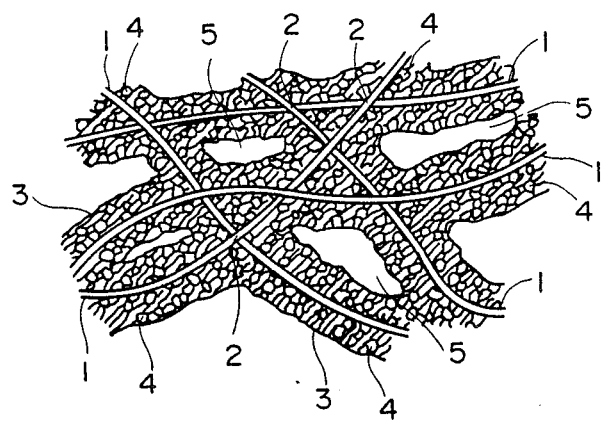

CORE MEMBER FOR FABRICATION OF SHAPED PLASTIC

FIELD OF THE INVENTION

This invention relates to a core member for fabrication of a shaped plastic. More particularly, this relates to a plastic body to be used as a core member for molding a shaped plastic, for instance, shaped fiber reinforced plastic (FRP). Further this relates to process for fabrication of the same with use of said core member.

BRIEFING OF THE DRAWING(S)

The drawing appended is intended to show a portionally enlarged view in section of an embodiment of the inventive core member.

DESCRIPTION OF RELATED ART

A resinous liquid composition which comprises styrene dissolved with unsaturated polyester (hereinafter this is noted as UP and the composition is noted as liquid UP), peroxide cure catalyst and cobalt-containing cure accelerator, has been commonly employed, by way of cure at an ambient temperature, to fabricate a shaped plastic with use of glass fiber as reinforcing material, wherein the shaped plastic of a product is well known as FRP. Then, in such manufacture of FRP products, in order to obtain products with less weight and improved heat-insulation, a core member which has been prepared beforehand independently of the liquid UP has been conveniently used as a core body intervening in a sandwich structure formation. A typical application thereof is molding of a hull of a FRP boat.

Some reference will be made to the core member as noted above with aid of the appended drawing, which shows an enlarged sectional view of a foamy core member, wherein 1 is non-woven fabric, 2 is a link point between fibers, 3 is matrix made of a cured binder resin which has clinged to fibers of the fabric fibers 1 and has adhered one another to form skelton frame or matrix portions of the core body, 4 is a microscopic void or foam resident in the interior solid of the matrix, as wll be explained, these microvoids are resulted by foaming action of microspheres previously incorporated in the preparation and 5 is a void spacing between matrix portions. Based on the features as shown, this kind of core member may be called foamy non-woven fabric as will appear often hereinlater. In a subsequent process of fabricating a shaped FRP, which process will be noted hereinlater as secondary process, such a void body in use as a core member for sandwich formation should be filled with the liquid UP, in other words, it is a requirement to fill or to saturate the liquid UP sufficiently into the voids (indicated by 5). However, conventionally, an adequate or reliable means has not been available to monitor this requirement and hence a level of the void-filling or infiltration into the voids with the liquid UP has been casually judged with eye observation of an operator concerned without an adequate index, but such conventional eye observation could not be reliable. The present invention is intended to overcome such disadvantage as has been experienced heretofore.

SUMMARY OF THE INVENTION

As noted above, sufficient infiltration of the liquid UP into the voids (5) formed in a core member or a foamy non-woven fabric is necessary in the secondary process to fabricate a physically strong or sturdy shaped product and the advantage of obtaining conveniently a reliable judgement or monitoring control on a degree of such filling will make a merit in use of this inventive core member. To this end, this invention proposes incorporation of a thiocyanate or rhodan compound into a formulation for treating the non-woven fabric, and then the incorporated thiocyanate compound is adapted or intended in the secondary process to make a chemical interference or action with cobalt metal contained in the accelerator which was incorporated in the liquid UP, commonly in form of naphthenic acid cobalt or octenic acid cobalt so that an unique color, a kind of green, will develop, whereby this color development can be sharply discerned. Thus, an operator concerned will readily know of how much filling thereinto has progressed or of how much evenness of the filling has been reached.

Some reference will be made to chemical behaviors involved therein with aid of the drawing, a thiocyanate compound incorporated in the binder-resin-based coating formulation, which will be noted as core coating, will be extracted or bled out of the matrix portions to be precipitated or exposed on surfaces of the matrix portions 3 and then, in the secondary process, when the liquid UP enters into the voids 5, the thiocyanate compound is then adapted to have a chance of encounting with the cobalt-containing compound which has been incorporated in the liquid UP.

Thus, in summary, the core member, in other words, foamy non-woven fabric has conventionally been prepared from a non-woven fabric, a binder resin and expandable microspheres, whereinto a thiocyanate compound is added, which features the present invention.

Below, description will be directed to main elements participating in the inventive core member and manufacture thereof.

(The word of "part(s)" is part in weight through the descriptions unless otherwise indicated)

A. Non Woven Fabric

In the present invention, various kinds of non-woven fabrics are available which are made from; customary thermoplastic synthetic fibers, for instance, polyester fiber, nylon fiber, polyacrylic fiber, polyvinyl-based fiber, polyolefin fiber, or from polyphenol-based fiber; further from inorganic fibers, for instance, metal fiber, carbon fiber, titanium fiber, glass fiber. Of them, suitable are those made from filamentary fibers of polyster or nylon, in particular, such filament of 0.5 to 15 denier, optimumly, 1 to 5 denier. In addition, non filamentary fibers are also available. A non woven fabric indicates generally a fabric in which elementary fibers, filaments or cut fibers, are randomly crossed to form a plied web and then sometimes subjected to the needle punching and resin treatment, wherein such a product fabric as has been made from filament is called spun bonded fabric. As for thickness or weight thereof, there is no particular limit, though, a thickness of 2 to 6 mm and a weight of 50 to 170 g/m$^2$ are preferred.

B. Binder Resin

As a binder resin which will adhere to cover fibers of the non-woven fabric, suitable are vinyl resin-based self-curable emulsions, for instance, emulsion of; polyvinylacetate.ethylene copolymer, polyvinyl-acetate.ethylene.acryl terpolymer, polyacrylic acid ester, polyurethane, methoxypolyamide, polyepoxide or a mixture of such emulsions. Of them, polyvinylacetate-.ethylene copolymer, polyvinyl-acetate.ethylene.acryl terpolymer are preferred for the merit of rendering a good filling performance with styrene, solvent of UP which will be applied in the secondary process and also of providing a flexibility with a core member to be obtained.

Preferred specifications for polyvinylacetate.ethylene copolymer are such that vinylacetate/ethylene=60/40 to 85/15 (molar basis) having a lower molecular weight (MW) and that, when a film is prepared from said copolymer alone, the film has physically in the order of 10 kg/cm$^2$ in tensile strength and 2200% in elengation and glass transition temperature at about $-15°$ C.

C. Microspheres (Microballoons)

This material is used to be mixed with the binder resin as noted in the preceding paragraph B and is adhered over the fibers and then is subjected to heat treatment, as will be explained later, in the meantime skins of the balloons are softened and expanded due to gasification of encapsulated liquid material, which expansion causes formation of microvoids resident in the matrix as indicated by 4 in the drawing.

Accordingly, spheres are preferably made from a thermoplastic resin, for instance, polystyrene, styrene copolymer, polyvinylchloride, polyvinylchloride copolymer, polyvinylidenechloride copolymer. As an expansive liquid to be encapsulated, azodicarbonamide, isobutane, freons (trademark) are suitable. And preferred size of balloons is in diameter of 4 to 20$\mu$ at non-expanded status and of 10 to 100$\mu$ at expanded status. As is understood, by expansive function of the spheres, the inventive core member is rendered foamy matrix portions 3 in the drawing to create less weight and heat-insulation as the core body.

D. Thiocyanate Compound

Examples are thiocyanic acid (rhodanic acid) and salts thereof, for instance, sodium thiocyanate, potassium thiocyanate, ammonium thiocyanate, calcium thiocyanate, cadmium thiocyanate. Of them, ammonium thiocyanate is preferable for its good color development, water solubility, further in view of cure capability of the liquid UP to be used in the secondary process and also general workabilities.

Reference is made to the process for preparation of the inventive core member with use of materials as noted above. The process comprises, first, preparation of a coating composition for a non-woven fabric, which is noted as core coating, wherein an emulsion form binder resin is mixed with the microspheres and additionally, thickener, PH adjuster (for instance, aqueous ammonia) as required to obtain an optimum workability, and the process comprises, next, treating the non-woven fabric with the core coating, followed by drying for heat cure.

Amount of the microspheres to be formulated to the binder resin is preferably ranged, in the use of mixture of polyvinylacetate.ethylene copolymer/polyacrylic acid ester copolymer, in 100 to 250 parts to 100 parts of the mixture.

Where the amount thereof is under 100 parts, foamy degree obtained becomes insufficient and, where over 250 parts, foamy degree becomes excess to result in inconvenience in handling of the core bodies and would require an increased amount of the liquid UP in the secondary process.

Amount of the thiocyanate compound to be formulated to the binder resin preferably is ranged, in use of the same mixture as above, in 2 to 200 parts based on 100 parts of the mixture.

Where the amount thereof is over 200 parts, insufficient cure of UP and inferior workability, and where under 2 parts, insufficient color development or unsuitably ineffective.

As for thickener, acrylic based or other known ones are available in a customary amount and in view of performance in impregnation, the core coating is advisable to have a viscosity of 500 to 2000 cps/20° C.

Treatment or impregnation of the non-woven fabric with the coating is carried out by a known circulator or coating machine, wherein an amount of impregnation is preferably ranged in 40 to 100 parts based on 100 parts of the fabric. Where under 40 parts, generally an intended core thickness is unobtainable, and where over 100 parts, the core bodies obtained become so hard and become less infiltrable with the liquid UP in the secondary process.

Control of impregnation amount is effected by overall cooperative adjustment including resin or solid concentration in the coating, visicosity, clearance of doctor knife, rotation ratio between roll coaters, squeezing ratio at the mangle unit and the like, and drying after the impregnation is effected by as known steam dryer or infrared heater and other customary dryers, wherein a preferable temperature is in 120° to 150° C.

The foamy non-woven fabric or core body thus obtained is preferred to have 1 to 6 mm in thickness, 50 to 250 g/m$^2$ in gross weight and 0.03 to 0.06 in gravity. And this foamy fabric may be subjected to punching treatment.

Now summarized reference is made to the foamy non-woven fabric or core member in the present invention.

This article is manufactured by incorporating the heat expandable microspheres into the emulsion form binder which will wet the non-woven fabric and, during drying, by heat effect, expansions of microspheres are aroused and thereby to swell up gross volume of the fabric so that the resinous matrix formed will occupy some spaces between fibers of the fabric wherein the expanded spheres will remain as microvoids. Selection of overall conditions will control remained spaces or voids in gross volume of the foamy fabric and microvoids in the matirx thereof. Thus this article is serviceable as core member to fabricate a FRP product for the merit of achieving light weight, increased rigidity, improved heat-insulation, better appearance and the like. It is to be noted here that treated non-woven fabric before subject to drying for heat cure, still somewhat wet, is noted herein as core member formation which is available in form of mat or resinous web.

EXAMPLES

Example 1

A non-woven fabric having 75 g/m$^2$ in unit weight, made from polyethylene terephthalate filament fibers having 4 denier in single thickness, was impregnated with a core coating which was formulated by mixture of 12.0 parts of self-curable polyvinylacetate.ethylene copolymer emulsion (solid content 50 wt. %) with 4.0 parts of vinylacetate.ethylene copolymer emulsion (solid con. 50 wt. %) and by 16.0 parts of polyvinylidene copolymer (hereinafter noted PVDC) -based microspheres (water content 30%), 0.8 part of silica balloon, 0.3 part of aqueous ammonia (22.5%), 2.3 parts of ammonium thiocyanate, 0.5 part of a thickener and 64.1 parts of water so as to have 700 cps in viscosity, and thereafter the wet fabric was squeezed by a mangle to have 160 g/m² in wet weight.

The load at this stage corresponds to a core member formation as noted above.

Then, the impregnated fabric was dried in a dryer in hang over a tenter at 135° C. for 60 sec., in the meantime aroused were expansions of the microspheres and cure of the self-curable polymer noted above. Data describing the impregnated fabric thus obtained, for instance, thickness, weight, will be noted in tables appearing hereinlater, and average diameter of microvoids formed was about 50μ.

In the secondary process, applied to the core member was a resinous liquid UP (hereinafter noted secondary coating) formulated by 52 parts of UP, 48 parts of styrene, 1 part of methylethylketone peroxide, and cobalt-containing accelerator, in all with 300 cps in viscosity (at 25° C.), wherein said secondary coating was flown evenly onto top and bottom faces of the core, with use of a roll so as to obtain 1300 g/m² as impregnated amount and then allowed to stand for 24 hrs., followed by cure at 80° C. for 24 hrs to finish as a sample of secondary product. Descriptions of the core member and secondary product sample are noted in the tables shown later.

Control Example 1 and Same 2

Excepting that, in the preceeding example 1, an incorporated amount of thiocyanate compound was reduced, similar operations were repeated to finish a secondary product sample of the control example 1 and further, without changing the amount of thiocyanate compound in the control example 1, a core member which would cause under-cure in the secondary process was intentionally prepared and was processed to finish as the product of the control example 2.

Properties of those examples, core members and secondary products, will be shown in the tables later.

Example 2

A non-woven fabric having 70 g/m² weight, made from polyethylene terephthalate cut fibers (blend of 50% of cut fibers having 6.0 d. with 37.5 mm cut length, and 50% of cut fibers having 2.0 d. with 37.5 mm), was impregnated as preliminary treatment with a coating, because this fabric is made from cut fibers and such a fabric should be enhanced of its fiber likages by the preliminary treatment, wherein the fabric was impregnated with the coating comprising acrylic acid ester so as to result in 20 g/m² of impregnated weight and then squeezed by a mangle and dried in a dryer over a tenter at 130° C. for 60 sec. to have 90 g/m² as fabric weight.

This pretreated fabric having 3.0 to 4.0 mm in thickness was subjected to calender treatment with a temperature of 125° C. under a pressure of 50 kg/cm² with a rate of 20 m/min. by a calender machine equipped with a mirror roll (heated metal roll/paper, cotton roll) to result in 0.42 mm in thickness.

Now it is to be noted that this calendered pretreated-fabric is equivalent to the fabric (unpretreated) in the example 1.

Then the fabric obtained was again impregnated with a core coating which was formulated by mixture of 5.0 parts of vinyl acetate.ethylene copolymer (solid 50%) with 5.0 parts of reactive methacryl acid alkyl ester.acrylic acid alkyl ester.N-alkylol acryl amide copolymer (solid 46.0%), and by 24.4 parts of PVDC-based microspheres (water content 30%), 0.3 part of aqueous ammonia (22.5%), 3.8 parts of ammonium thiocyanate and 0.5 part of a thickener, further 61.0 parts of water, in all with 2000 cps in visicosity (at 20° C.) and squeezed by a mangle to have 330 g/m² in wet weight.

The impregnated fabric was then dried in a dryer over a tenter at 135° C. for 120 sec. while expansions of the microspheres and cure of the reactive copolymer were simultaneously aroused. The core member thus obtained will be described in the tables later of its properties, for instance, thickness, weight and the microvoids were in average of 55μ in diameter.

The core member was then subjected to the secondary process, in similar manner to the example 1 with use of the liquid UP secondary coating, whereby impregnation amount was 2600 g/m² and thus finished as secondary product, of which description is also given in the tables later.

As will be seen, in the examples including the control ones noted above, descriptions are directed to preparations of non-reinforced plastic (secondary product) with use of the liquid UP, dispensing with glass fiber as reinforcing material, which is due to the desire of describing the present invention with merit on test concerning the color development as noted before, of which data will also appear later. However, irrespective of lack of disclosure on the reinforcing examples, the inventive core members will be certainly utilized in manufacture of FRP.

Before entering to description of the data obtained, specifications of test methods employed will be referred to.

(1) Thickness (mm)

The thickness tester employed was capable of measuring at 0.01 mm order and of measuring on its measuring circle of 10 mm in diameter under less than 10 gram weight, which will be noted non-weight thickness meter. Data are given in average derived from 20 spot measurements with an equal space each other.

(2) Weight (g/m²)

According to JIS-K-6328

(3) Void ratio (%)

This indicates a volume percentage of space portions sharing in a gross volume of a core body, which was measured and calculated according to the process noted as below:

(3)-1

Of a piece of rectangular example having 7 cm × 7 cm sides, 8 points on periphery (4 corners and middle points of the sides) and a center of the rectangle were selected to measure of its thicknesses and average value was obtained, which is indicated as h mm.

(3)-2

Of the same piece, lengths of two sides, longitudinal (t cm) and side (y cm), were measured and then the weight was tested, assumed to be W1 gr.

(3)-3

70 parts of propylene glycol was diluted with (40± x) parts of water, wherein x was selected case by case to adjust the diluted so as to have a viscosity of 7 to 12 cps (at 20° C.), which is assumed as impregnating liquid, of which 300 cc was taken in a 2 liter beaker.

(3)-4

The test piece was immersed in said 2 liter beaker for 2 min. and excessively adhered liquid was wiped off and then weight thereof was measured, which weight is indicated as W2 gr.

(3)-5 Void Percentage (%)

This is calculated by the following formula:
$K = [(W2-W1)/d(density)/(0.1 \times h \times t \times y)] \times 100 \, (\%)$ (3)-6

Measurements and calculations as noted were repeated of three different pieces and the average value thereof is employed as resultant data of the void ratio.

(4) Impregnation (Through out=TO, sec.)

A test piece was of 10 cm in width and 10 cm in length and the number of the pieces n=3, wherein spots to be measured were corners and center, similar in the case of void ratio. Then the test piece was placed on the mouth of a transparent beaker of 9 cm in diameter and 30 cc, previously measured, of the liquid UP (300 cps/25° C.) was flown onto the piece momentarily and measured was time requirement to finish complete infiltration or through out.

TO was measured with three pieces and the maximal time of them is adopted to indicate TO value.

(5) Impregnation (Wet Out=WO, sec.)

A test piece was of 3 cm in width and 3 cm in length and the number of the pieces n=3, wherein spots to be measured were corners and center, similar in the case of void ratio. Then the test piece was placed, with a face having larger holes up, to be afloat on liquid surface of 100 cc of the UP (300 cps/25° C.) which had been placed in a beaker and then measured was time (sec.) until the liquid UP impregnates or wets out on the whole up-face of the piece.

(6) Color Development

Observation was made to determine a degree of the color which was developed by a thiocyanate compound and cobalt, when a sample core was impregnated or saturated with the liquid UP for hand layup use.

O ... The color has changed distinctively

X ... The color has not changed distinctively (7) Cure Suitability

Observation was made to determine a cure status which was reached with a sample core which had been impregnated or saturated with UP for hand layup use, followed by allowance for 24 hrs and cure treatment at 80° C. for 24 hrs.

O ... Good cure

X ... Impared cure (crack is easy to occur)

Data obtained in the examples above are given in the following tables 1 and 2:

Wherein "self-curer" is self-curable polyvinylacetate-.ethylene copolymer, "vinyl copolymer" is polyvinylacetate.ethylene copolymer, "reactive copolymer" is reactive acrylic copolymer, "SCN.Am" is ammonium thiocyanate, "SCN.Am %" is an amount % of ammonium thiocyanate to the binder resin in a core coating formulation, "ester" is polyester fiber.

TABLE 1

|  | Example 1 | Example 2 |
|---|---|---|
| Non-woven fabric |  |  |
| Kind of fiber | filament | cut fiber |
| Composition | ester 4d | ester 6d · 50% |
|  | (100%) | ester 2d · 50% |
| Unit weight | 75 | 90 |
| Core coating |  |  |
| Microsphere | 16.0 | 24.4 |
| Self-curer | 12.0 | — |
| Vinyl copolymer | 4.0 | 5.0 |
| Reactive copolymer | — | 5.0 |
| Silica ballon | 0.8 | — |
| Aq. ammonia | 0.3 | 0.3 |
| Thickener | 0.5 | 0.5 |
| SCN · Am | 2.3 | 3.8 |
| SCN · Am % | 29% | 76% |
| Water | 64.1 | 61.0 |
| Core member |  |  |
| Thickness | 2.22 | 4.57 |
| Weight | 96.0 | 138.0 |
| Void ratio | 51.6% | 59.3% |
| TO | 4 | 13 |
| WO | 20 | 36 |
| Secondary product |  |  |
| Developed color | green | green |
| Color distinction | O | O |
| Core suitness | O | O |

TABLE 2

|  | Control 1 | Control 2 |
|---|---|---|
| Non-woven fabric |  |  |
| Kind of fiber | filament | filament |
| Composition | ester 4d | ester 4d |
|  | (100%) | (100%) |
| Unit weight | 75 | 75 |
| Core coating |  |  |
| Microsphere | 16.0 | 16.0 |
| Self-curer | 12.0 | 12.0 |
| Vinyl copolymer | 4.0 | 4.0 |
| Reactive copolymer | — | — |
| Silica ballon | 0.8 | 0.8 |
| Aq. ammonia | 0.3 | 0.3 |
| Thickener | 0.5 | 0.5 |
| SCN · Am | 0.1 | 16.8 |
| SCN · Am % | 1.2% | 210.0% |
| Water | 66.3 | 49.6 |
| Core member |  |  |
| Thickness | 2.21 | 2.27 |
| Weight | 92.0 | 97.0 |
| Void ratio | 58.1% | 53.7% |
| TO | 6 | 8 |
| WO | 10 | 23 |
| Secondary product |  |  |
| Developed color | light green | dark green |
| Color distinction | X | O |
| Cure suitness | O | X |

We claim:

1. A porous core member for fabricating a fiber-reinforced shaped plastic having a matrix structure comprising matrix portions and voids between the matrix portions capable of being infiltrated by a liquid resin, said matrix portions being formed of fibers randomly arranged in a non-woven fabric, said fibers having adhered thereto a cured vinyl resin having microvoids therein, and said vinyl resin containing a thiocyanate compound.

2. A porous core member as defined in claim 1, wherein the vinyl resin is an ethylene-vinylacetate copolymer, an ethylene-vinylacetate-acrylic terpolymer, a polyacrylic acid ester, a polyurethane, a methoxypolyamide, a polyepoxide or mixtures thereof.

3. A porous core member as defined in claim 1, wherein the thiocyanate compound is sodium thiocyanate, potassium thiocyanate ammonium thiocyanate, calcium thiocyanate or cadmium thiocyanate.

4. A porous core member as defined in claim 1, wherein the core member has a thickness of 1 to 6 mm, a gross weight in a range of 50 to 250 g/m$^2$ and a gravity of 0.03 to 0.06.

5. A porous core member as defined in claim 1, wherein the microvoids have an average diameter 10 to 100μ.

6. A resin-impregnated non-woven fabric adapted to form on heating a core member having a matrix structure for fabricating a fiber-reinforced shaped plastic, which comprises a non-woven fabric impregnated with an emulsion of a heat-curable vinyl resin containing heat-expandable microspheres and a thiocyanate compound.

7. A resin-impregnated non-woven fabric as defined in claim 6, wherein the heat-curable vinyl resin is an ethylene-vinylacetate copolymer, an ethylene-vinylacetate-acrylic terpolymer, a polyacrylic acid ester, a polyurethane, a methoxypolyamide, a polyepoxide or mixtures thereof.

8. A resin-impregnated non-woven fabric as defined in claim 6, wherein the thiocyanate compound is sodium thiocyanate, potassium thiocyanate, ammonium thiocyanate, calcium thiocyanate or cadmium thiocyanate.

* * * * *